(12) United States Patent
Sasaki et al.

(10) Patent No.: US 9,196,900 B2
(45) Date of Patent: Nov. 24, 2015

(54) SUBSTRATE AND SECONDARY BATTERY

(71) Applicants: KABUSHIKI KAISHA TOSHIBA, Minato-ku, Tokyo (JP); TOSHIBA MATERIALS CO., LTD., Yokohama-shi, Kanagawa (JP)

(72) Inventors: Akito Sasaki, Yokohama (JP); Miho Nakamura, Ayase (JP); Tomomichi Naka, Tokyo (JP); Yoko Tokuno, Tokyo (JP); Hideyuki Oozu, Yokohama (JP)

(73) Assignees: Kabushiki Kaisha Toshiba, Minato-Ku (JP); Toshiba Materials Co., Ltd., Yokohama-Shi (JP)

( * ) Notice: Subject to any disclaimer, the term of this patent is extended or adjusted under 35 U.S.C. 154(b) by 147 days.

(21) Appl. No.: 13/784,938

(22) Filed: Mar. 5, 2013

(65) Prior Publication Data
US 2013/0252084 A1    Sep. 26, 2013

(30) Foreign Application Priority Data

Mar. 26, 2012  (JP) ................................ 2012-068970

(51) Int. Cl.
*H01M 4/48*    (2010.01)
*H01M 4/36*    (2006.01)
*H01M 14/00*   (2006.01)
*H01M 16/00*   (2006.01)

(52) U.S. Cl.
CPC ............... *H01M 4/48* (2013.01); *H01M 4/364* (2013.01); *H01M 4/366* (2013.01); *H01M 4/483* (2013.01); *H01M 14/00* (2013.01); *H01M 16/00* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 5,525,264 A * | 6/1996 | Cronin et al. ................. | 252/583 |
| 7,202,412 B2 | 4/2007 | Yamanaka et al. | |
| 8,395,041 B2 | 3/2013 | Kawasaki et al. | |
| 8,821,967 B2 | 9/2014 | Wu et al. | |
| 8,895,849 B2 | 11/2014 | Nakahara et al. | |
| 2005/0025700 A1* | 2/2005 | Bulian et al. .................. | 423/606 |
| 2007/0095390 A1 | 5/2007 | Ahn et al. | |
| 2009/0197182 A1* | 8/2009 | Katoh .......................... | 429/305 |
| 2010/0281587 A1 | 11/2010 | Shingaya et al. | |
| 2011/0059842 A1* | 3/2011 | Wachs et al. .................. | 502/242 |

(Continued)

FOREIGN PATENT DOCUMENTS

| CN | 1433085 A | 7/2003 |
|---|---|---|
| CN | 101030605 A | 9/2007 |

(Continued)

OTHER PUBLICATIONS

Cronin et. al. Solar Energy Materials and Solar Cells, 29, 1993, 371-386.*

(Continued)

*Primary Examiner* — Vera Katz
(74) *Attorney, Agent, or Firm* — Burr & Brown, PLLC

(57) ABSTRACT

According to one embodiment, a substrate includes a semiconductor layer. The semiconductor layer comprises tungsten oxide particles having a first peak in a range of 268 to 274 $cm^{-1}$, a second peak in a range of 630 to 720 $cm^{-1}$, and a third peak in a range of 800 to 810 $cm^{-1}$ in Raman spectroscopic analysis. The semiconductor layer has a thickness of 1 μm or more. The semiconductor layer has a porosity of 20 to 80 vol %.

12 Claims, 2 Drawing Sheets

(56) References Cited

U.S. PATENT DOCUMENTS

2011/0297419 A1    12/2011    Nagayama et al.
2015/0034149 A1*   2/2015     Sasaki et al. .................. 136/252

FOREIGN PATENT DOCUMENTS

| CN | 101866757 A    | 10/2010 |
| CN | 102230172 A    | 11/2011 |
| CN | 102326281 A    | 1/2012  |
| CN | 102341952 A    | 2/2012  |
| JP | 2008-204956    | 9/2008  |
| JP | 2009-131790 A  | 6/2009  |
| JP | 2009-135025    | 6/2009  |
| JP | 2009-283429 A1 | 12/2009 |

OTHER PUBLICATIONS

Regragui et. al. Thin Solid Films, 358, 2000, 40-45.*
Taiwanese Office Action (Application No. 102107856) dated Jun. 6, 2014 (with English translation).
Chinese Office Action (With English Translation), Chinese Application No. 201310062027.9, dated Jan. 14, 2015 (14 pages).
Chinese Office Action (With English Translation), Chinese Application No. 201310062027.9, dated Jul. 31, 2015 (20 pages).

* cited by examiner

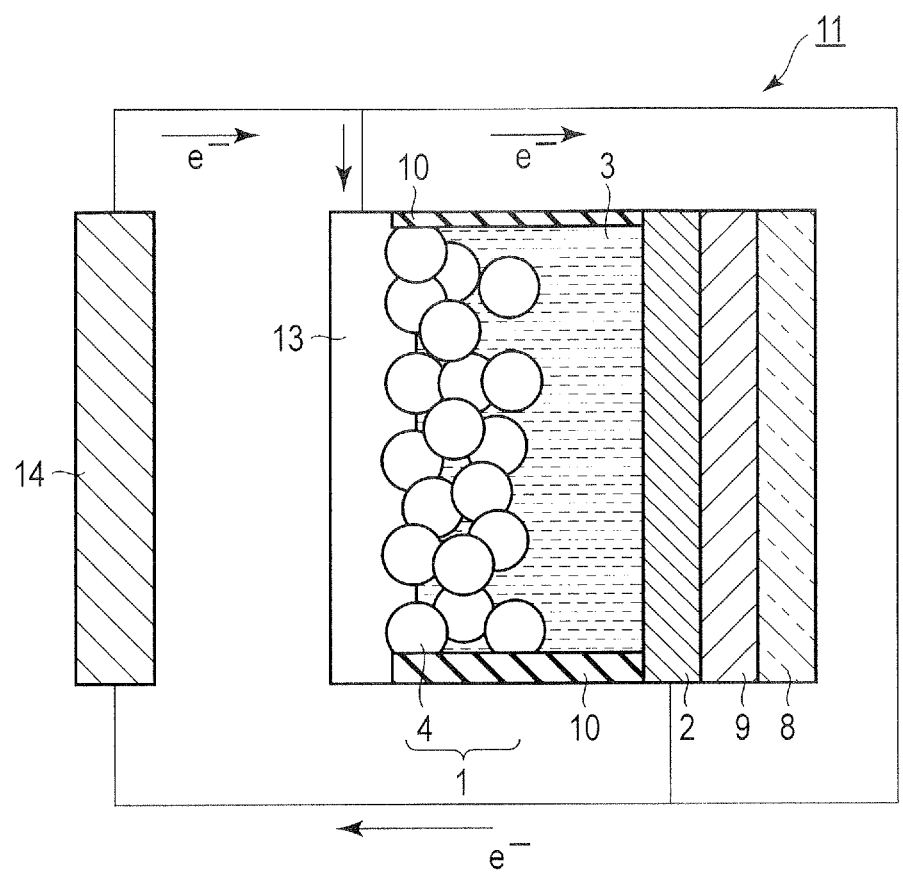
F I G. 1

SUBSTRATE AND SECONDARY BATTERY

CROSS-REFERENCE TO RELATED APPLICATIONS

This application is based upon and claims the benefit of priority from Japanese Patent Application No. 2012-068970, filed Mar. 26, 2012, the entire contents of which are incorporated herein by reference.

FIELD OF THE INVENTION

Embodiments described herein relate generally to a substrate and a secondary battery.

BACKGROUND OF THE INVENTION

Solar cells have attracts attention as natural energy sources. In the conventional solar cells, a silicon based solar cell has been a mainstream. The silicon based solar cell has achieved a power generation efficiency of 10% or more. On the other hand, in the case of a dye-sensitized solar cell, constant power generation efficiency is obtained by using titanium oxide particles as an electrode material.

Incidentally, the solar cell is literally a cell that uses sunlight and the production of electricity changes according to the amount of sunlight. Thus, when the amount of sunlight rapidly changes, the production of electricity is rapidly reduced. The silicon based solar cell is sensitive to changes in the amount of sunlight. If an abrupt change in the weather occurs, a phenomenon in which the production of electricity rapidly becomes zero is caused. In order to solve the problem, there is a need for a secondary battery which can store electricity efficiently.

BRIEF DESCRIPTION OF THE DRAWINGS

FIG. 1 is a cross-sectional view showing a secondary battery system comprising a secondary battery of an embodiment.

DETAILED DESCRIPTION OF THE INVENTION

Figure 2:
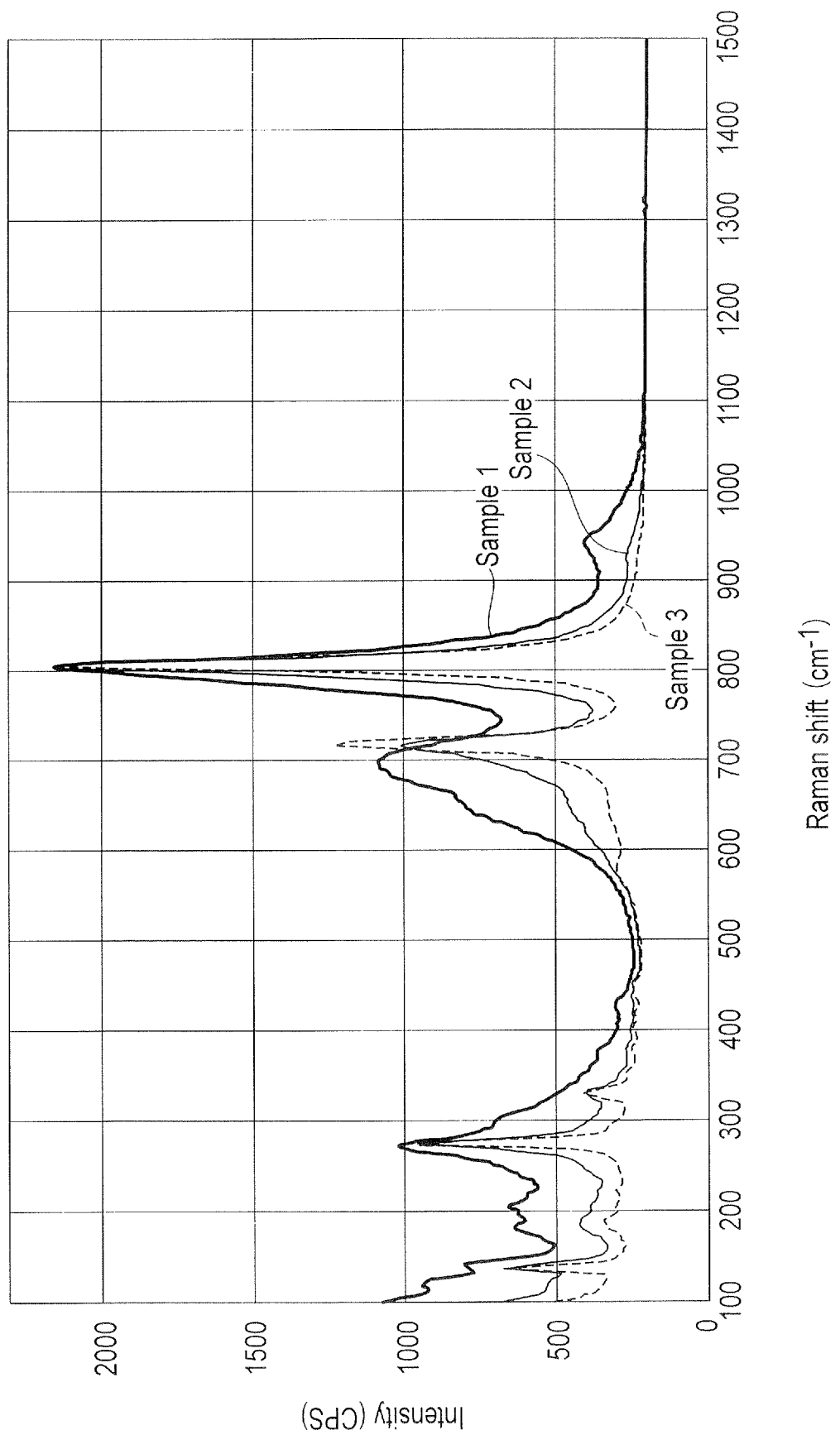
FIG. 2 is a chart showing Raman spectroscopic analysis results of tungsten oxide particles, which is used in the embodiment.

Hereinafter, embodiments will be described with reference to the drawings.

First Embodiment

According to a first embodiment, there is provided a substrate for secondary battery which includes a semiconductor layer. The semiconductor layer contains tungsten oxide particles. The tungsten oxide particles has a first peak in a range of 268 to 274 $cm^{-1}$, a second peak in a range of 630 to 720 $cm^{-1}$, and a third peak in a range of 800 to 810 $cm^{-1}$ in the Raman spectroscopic analysis. The semiconductor layer has a thickness of 1 µm or more and a porosity of 20 to 80 vol %.

When the tungsten oxide particles has the first peak, the second peak, and the third peak, the electrical storage function of the tungsten oxide particles can be improved. However, even if the tungsten oxide particles having the first to third peaks is used, when the thickness of the semiconductor layer is less than 1 µm or the porosity of the semiconductor layer is less than 20 vol %, the retention capacity of the electrolyte composition in the semiconductor layer is reduced. Accordingly, it is difficult to improve the electrical storage performance. Even if the thickness of the semiconductor layer is 1 µm or more, when the porosity exceeds 80 vol %, the amount of the tungsten oxide particles is insufficient. Accordingly, the electrical storage performance is poor. When the tungsten oxide particles having the first to third peaks is used, the thickness of the semiconductor layer is set to 1 µm or more, and the porosity is set to a range of 20 to 80 vol %, it is possible to improve the electrical storage function of the tungsten oxide particles and the retention capacity of the electrolyte composition in the semiconductor layer.

The thickness of the semiconductor layer is desirably set to 5 µm or more. This allows an electrical storage capacity of the substrate to be increased. If the semiconductor layer is thicker, it is advantageous to improve the electrical storage capacity. However, if the thickness is too thick, the permeability of the electrolyte composition may be reduced. Thus, the upper limit of the thickness of the semiconductor layer is desirably set to 300 µm or less.

A more preferable range of the porosity is from 40 to 70 vol %.

The average pore size of the semiconductor layer is preferably 5 nm or more. This allows the uniformity of distribution of the electrolyte composition when the electrolyte composition is retained in the semiconductor layer to be improved. A more preferable range of the average size is from 7 to 20 nm.

The average BET specific surface area of the tungsten oxide particles can be set to 0.1 $m^2/g$ or more. This allows the contact area between the tungsten oxide particles and the electrolyte composition to be improved. The upper limit of the average BET specific surface area can be set to 150 $m^2/g$ or less.

It is desirable to form a coating on at least a part of the surfaces of the tungsten oxide particles. A material for forming a coating includes inorganic substances such as metal oxides and metal nitrides, and organic compounds. A preferable material is at least one kind of compound selected from the group consisting of $Y_2O_3$, $TiO_2$, $ZnO$, $SnO_2$, $ZrO_2$, $MgO$, $Al_2O_3$, $CeO_2$, $Bi_2O_3$, $Mn_3O_4$, $Tm_2O_3$, $Ta_2O_5$, $Nb_2O_5$, $La_2O_3$, and ITO. The improvement of electrical storage performance can be expected by forming a coating on at least a part of the surfaces of the tungsten oxide particles. When a metal oxide is used for a coating material, the oxygen deficiency of tungsten oxide can be reduced.

The tungsten oxide particles is produced by, for example, the following method. First, a plasma process is performed. As coarse particles of tungsten oxide, tungsten oxide particles having an average particle diameter of 10 µm or less, preferably 1 to 5 µm are prepared. If the average particle diameter of the coarse particles exceeds 10 µm, it becomes difficult to uniformly introduce the coarse particles into the plasma flame. On the other hand, if the average particle diameter is as small as less than 1 µm, it becomes difficult to prepare coarse particles. This causes cost increases.

As the plasma flame, it is preferable to use a hot flame having a central temperature of 8000° C. or more, further preferably 10000° C. or more. Fine tungsten oxide particles can be obtained by heat treatment in an oxygen containing atmosphere such as air using the hot plasma flame. After the introduction into the plasma flame, it is preferable to subject the tungsten oxide particles scattered from the plasma flame to a quenching process at a rate of 1000° C./s or more at a distance of 1 m or more. Desired tungsten oxide particles can be obtained by introducing a high temperature plasma flame and performing a predetermined quenching process.

Subsequently, the heat treatment process is performed. The heat treatment process is a process of heating the tungsten oxide particles produced in the plasma process (as-plasma particles) in an oxidizing atmosphere at a predetermined temperature for a predetermined time. The as-plasma particles may have a lot of defects on its surface and may contain some tungsten oxides in which a ratio of W to O is lower than 1:3 ($W_xO_y$, y/x<3) and $WO_3$. When the heat treatment process is added, the surface defect is reduced and the proportion of $WO_3$ in tungsten oxide is 99% or more. The crystal structure and particle diameter of the tungsten oxide particles can be controlled depending on the conditions of the heat treatment.

A specific heat treatment temperature (the maximum temperature in the heat treatment process) may be from 300 to 1000° C., preferably from 450 to 600° C. The heat treatment time (a retention time at the maximum temperature) may be 10 minutes or more, preferably from 2 to 60 hours. This is because the particles are slowly oxidized in a temperature range where the reaction rate is low in order to reduce defects on the surface and inside of the particles. In the case of high temperatures where the reaction rate is high, the heat treatment is finished in a short time. This is advantageous in terms of the process cost. However, the as-plasma particles are not uniformly heated. Thus the crystal structure and the particle diameter after the heat treatment become uneven, and defects on the surface or inside of the particles are remained. Thus, this is not preferred. Particularly, when the temperature exceeds 1000° C., the tungsten oxide particles cause a rapid grain growth. Thus, this is not preferred.

The oxidizing atmosphere may be oxygen gas atmosphere, air atmosphere, an inert gas atmosphere containing steam or oxygen, an underwater atmosphere or the like. The pressure in the atmosphere may be an atmospheric pressure or a pressurized atmosphere. The heating may be performed by atmospheric heat conduction, radiant heat (e.g., an electric furnace), high frequency wave radiation, microwave radiation or laser radiation.

The semiconductor layer desirably contains at least one kind of second particles selected from the group consisting of metal oxide particles, metal boride particles, metal fluoride particles, carbonate particles, carbon particles, metal carbide particles, and metal particles. A preferred second particles are at least one kind of particles selected from the group consisting of Fe, Mn, Co, Ni, $Li_2O$, LiF, $Na_2O$, $K_2O$, MgO, CaO, MnO, $MnO_2$, FeO, $Fe_2O_3$, CoO, NiO, $Cu_2O$, $B_2O_3$, $SiO_2$, $La_2O_3$, $ZrO_2$, $Y_2O_3$, C, $LaB_6$, ITO, and ATO. When an oxide is used for the second particles, the sinterability of tungsten oxide particles can be improved. Further, tungsten oxide and a conductive film, and also the necking among tungsten oxide particles can be improved. Thus, the physical bond can be strengthened and the reliability for components can be improved. In addition to this, when the grain boundary resistance is decreased, the conductivity can be improved and the electrical storage performance can be improved. The use of a conductive material (e.g., Fe, Mn, Co, Ni, C, ITO, ATO) for the second particles allows the conductivity of the semiconductor layer to be improved. Accordingly, the electrical storage performance can be improved. When the total amount of the tungsten oxide particles and the second particles is 100 mass %, the additive amount of the second particles is preferably from 1 to 10 mass %. If the additive amount is less than 1 mass %, the effect of addition is not sufficiently provided. If the additive amount exceeds 10 mass %, the additive amount is too much, which may impair electrical storage characteristics of the tungsten oxide particles. A preferred range of the additive amount is from 2 to 6 mass %.

(Raman Spectroscopic Analysis)

Raman spectroscopic analysis is performed in the following manner. As an apparatus, PDP-320 (manufactured by Photon Design) is used. Measurement conditions are as follows: measurement mode: micro-Raman, measurement magnification: 100-fold, beam diameter: 1 μm or less, light source $Ar^+$ laser (wavelength: 514.5 nm), laser power: 0.5 mW (at tube), diffraction grating single: 600 gr/mm, cross slit: 100 μm, slit: 100 μm, and detector: CCD/Roper, 1340 channel. Under the conditions, samples in a range of 100 to 1500 $cm^{-1}$ are analyzed. The samples in the form of tungsten oxide particles can be directly measured.

The thickness, porosity, and average pore size of the semiconductor layer is measured as follows.

(Thickness of Semiconductor Layer)

An arbitrary cross section that includes the upper end of the semiconductor layer is enlargedly photographed with a magnification of 5000-fold or more. A view angle of the semiconductor layer in the cross section is about at least "1 μm or more in thickness×10 μm in width". The upper end of the semiconductor layer is the surface on the opposite side of the surface contacting with the conductive film. The opposite side of the surface contacting with the conductive film corresponds to the side of the conductive catalyst layer 2 of the semiconductor layer 1 in FIG. 1. Then, an enlarged photograph 1 is obtained. In the enlarged photograph 1, three arbitrary parts of the thickness are measured and an average of the parts is defined as a thickness (film thickness).

(Porosity of Semiconductor Layer)

An arbitrary cross section that includes the upper end of the semiconductor layer is enlargedly photographed with a magnification of 100.000-fold or more. A view angle of the semiconductor layer in the cross section is about at least "1 μm or more in thickness×10 μm in width". Then, an enlarged photograph 2 is obtained. Based on the contrast of the enlarged photograph 2, it is possible to distinguish between the tungsten oxide particles and the pores. Based on the enlarged photograph 2, the pore area in a unit area of 1 μm×3 μm is calculated. When the unit area (1 μm×3 μm) per field cannot be photographed, the area is photographed a plurality of times until the total area becomes 1 μm×3 μm.

(Average Pore Size of Semiconductor Layer)

Based on the enlarged photograph 2, an average pore size is calculated by a line intercept method. Specifically, in order to draw an arbitrary straight on the enlarged photograph 2, a straight line is drawn from an arbitrary end of the enlarged photograph 2, and the number of pores present on the straight line and the total pore length are calculated. An average size is obtained by dividing the total pore length by the number of pores. This calculation is performed on three arbitrary straight lines, and an average thereof is defined as an average pore size.

The substrate for secondary battery of the embodiment may include a support substrate, such as a glass substrate, and a conductive film formed on the support substrate. It is possible to form the semiconductor layer on the conductive film. The conductive film includes transparent conductive films such as ITO and ATO. The thickness of the conductive film may be set to a range of 10 to 200 nm. The support substrate and the conductive film are not limited to transparent ones. For example, semitransparent ones may be used. As the support substrate, a metal substrate may be used. When the metal substrate is used, the back surface is insulated. The metal substrate is preferably a material which is difficult to be corroded by electrolytic solutions such as titanium (Ti), ruthenium (Ru), and tungsten (W). When the metal substrate which is resistant to decay is used, it is not necessary to form the conductive film, like the glass substrate.

Further, the surface of the support substrate may be roughened. When the surface of the glass substrate (i.e., the support substrate) or the metal substrate is roughened and the conductive film is formed on the surface, the adhesion of the semiconductor layer or the conductive catalyst layer is improved. Thus, a surface roughness Ra of the support substrate is preferably from 0.1 to 1.0 μm, more preferably from 0.1 to 0.5 μm.

The semiconductor layer is formed by, for example, the method described below. A paste containing tungsten oxide particles is prepared. The paste contains tungsten oxide particles, a binder, and a solvent. When the total amount of tungsten oxide particles (including an additive when the additive is added), a binder, and a solvent is 100 wt %, it is preferable that the amount of the tungsten oxide particles (including an additive and a coating) is from 5 to 50 wt % and the amount of the binder is from 3 to 30 wt %. As the binder, an organic binder having a thermal decomposition rate of 99.0% or more at 500° C. is preferred. If the thermal decomposition can be performed at 500° C. or less, it is possible to prevent the glass substrate or the like from being damaged. Examples of the binder include ethyl cellulose and polyethylene glycol. Examples of the solvent include alcohols, organic solvents, and pure water. Among them, an alcoholic solvent is preferred.

In the mixing process to adjust the paste, it is preferable to perform a process comprising: mixing a solvent with a binder; mixing the mixture; adding tungsten oxide particles thereto; and stirring the mixture. If the tungsten oxide particles and the binder are added to the solvent at once, the mixture easily becomes a paste with a lot of aggregates. When the tungsten oxide particles are microparticles having a BET surface area of 5 m$^2$/g or more, it is necessary to sufficiently stir the mixture.

The viscosity of the paste is preferably from 800 to 10000 c.p.s. at room temperature (25° C.). The semiconductor layer is formed by, for example, applying a paste including tungsten oxide by the screen printing and sintering it at 500° C. or less. It is effective in performing the printing a plurality of times until the film thickness becomes a required thickness. When the amount of the binder is in the above range, the porosity can be easily adjusted to a range of 20 to 80 vol %. The sintering temperature is set to a range of 200 to 500° C. so as not to damage a substrate such as a glass substrate. When the binder is thermally decomposed rapidly by adjusting the rate of temperature increase to 100° C./h or more, the average pore size can be easily adjusted to 5 nm or more.

In the process of adjusting the porosity, it is effective to use tungsten oxide particles having different particle diameters to be mixed. The tungsten oxide particles having different particle diameters represent tungsten oxide particles in which two or more peaks in the particle size distribution are detected. When small particles (small diameter particles) are mixed with large particles (large diameter particles), the small particles enter into gaps among the large particles. Thus, the porosity can be easily adjusted.

When the tungsten oxide particles having different particle diameters are mixed for use, the average particle diameter of small diameter particles is preferably from 10 to 100 nm. Further, the average particle diameter is preferably from 10 to 40 nm. The average particle diameter of large diameter particles is preferably 5 to 50 times that of small diameter particles. The blending amount ratio is preferably A:B=50:1-1:10 when the amount of small diameter particles is based on "A" part by mass, the amount of large diameter particles is "B" part by mass, and a total of "A" part by mass and "B" part by mass equals to 100 parts by mass. Under the conditions, the porosity of the semiconductor layer is easily adjusted.

According to the substrate for secondary battery of the first embodiment described above, since the substrate includes a semiconductor layer which includes tungsten oxide particles having a first peak in a range of 268 to 274 cm$^{-1}$, a second peak in a range of 630 to 720 cm$^{-1}$, and a third peak in a range of 800 to 810 cm$^{-1}$ in the Raman spectroscopic analysis and has a thickness of 1 μm or more and a porosity of 20 to 80 vol %, the electrical storage function of the tungsten oxide particles as well as the retention capacity of the electrolyte composition in the semiconductor layer can be improved. The use of the semiconductor layer allows the electrical storage performance of the secondary battery to be improved.

Second Embodiment

According to a second embodiment, there is provided a secondary battery including a semiconductor electrode, an opposed electrode, and an electrolyte composition. The semiconductor electrode includes the substrate for secondary battery according to the first embodiment. The electrolyte composition is provided between the semiconductor electrode and the opposed electrode.

An example of a secondary battery system comprising the secondary battery of the second embodiment is shown in FIG. 1. The secondary battery system shown in FIG. 1 comprises a secondary battery 11 and a solar cell 14. The secondary battery 11 includes a semiconductor electrode, an opposed electrode, and an electrolyte composition 3. The semiconductor electrode includes a support substrate 13 and a semiconductor layer 1 formed on the support substrate 13 through a conductive film (not shown). The semiconductor layer 1 contains tungsten oxide particles 4. The opposed electrode includes a support substrate 8 like a glass substrate, a conductive film 9 on the support substrate 8, and a conductive catalyst layer 2 formed on the conductive film 9. The space between the semiconductor electrode and the opposed electrode is sealed with a sealing resin 10. The semiconductor layer 1 is impregnated with the electrolyte composition 3, which is comprised of, for example, an electrolytic solution. Additionally, the space between the semiconductor layer 1 and the conductive catalyst layer 2 is filled with the electrolyte composition 3. The solar cell 14 is connected to the semiconductor electrode and the opposed electrode of the secondary battery 11. The solar cell 14 is not particularly limited. Usable examples thereof include silicon (Si) solar cells, CIGS (Copper Indium Gallium DiSelenide) solar cells, titanium oxide (TiO$_2$) solar cells, dye-sensitized solar cells (DSSC).

If the electrons generated by the power generation of the solar cell 14 are supplied to the secondary battery, the supporting electrolyte in the electrolyte composition 3 is ionized and the generated ions (e.g., Li$^+$) are electrochemically reduced on the surface of the tungsten oxide particles 4 of the semiconductor layer 1, thereby a charge reaction is caused. The electrons accumulated in the tungsten oxide particles 4 are flown outside, which causes a discharge reaction. The opposed electrode is a positive electrode, and the semiconductor electrode is a negative electrode.

According to the secondary battery system, the electric energy generated by the power generation of the solar cell 14 can be stored in the secondary battery 11. When the production of electricity becomes zero due to the shortage of the amount of sunlight, the electric energy stored in the secondary battery 11 can be used. Accordingly, even if an abrupt change in the weather occurs, energy can be stably supplied.

Hereinafter, the opposed electrode and the electrolyte composition will be described.

(Opposed Electrode)

An opposed electrode includes a support substrate 8, a conductive film 9, and a conductive catalyst layer 2. The conductive catalyst layer 2 contains, for example, a platinum (Pt) layer. A conductive organic compound can be used for the conductive catalyst layer 2. Examples of the conductive organic compound include polyethylene dioxythiophene (PEDOT). The conductive film 9 includes transparent conductive films such as ITO and ATO. The thickness of the conductive film 9 may be set to a range of 10 to 200 nm. The support substrate 8 and the conductive film 9 are not limited to transparent ones. For example, semitransparent ones may be used.

(Electrolyte Composition)

The electrolyte composition 3 includes a reversible redox couple and a supporting electrolyte.

The reversible redox couple can be supplied from, for example, a mixture of iodine ($I_2$) and an iodide, an iodide, a bromide, hydroquinone, and a TCNQ complex. Particularly, it is preferable to use a redox couple consisting of $I^-$ and $I_3^-$ supplied from a mixture of iodine and an iodide. As the iodide, lithium iodide (LiI) is preferred.

When the mixture of iodine and an iodide is used, the concentration of iodine in the electrolyte composition is preferably from 0.01 to 5 mol/L, and the concentration of the iodide is preferably from 0.5 to 5 mol/L. When the concentration of the mixture of iodine and an iodide is in the above-mentioned range, an oxidation-reduction reaction can be efficiently performed. Thus, it is possible to reduce the charge transfer resistance in the electrolyte composition and the reaction resistance in the counter electrode.

As the supporting electrolyte which provides the electrical storage function, for example, a lithium salt is used. Examples of the lithium salt may include lithium halide, lithium perchlorate, lithium hexafluorophosphate, lithium tetrafluoroborate, $LiN(SO_2Rf)_2$.$LiC(SO_2Rf)_3$ (wherein Rf=$CF_3,C_2F_5$), and LiBOB (lithium bis(oxalate)borate). The lithium salts may be used alone or in combination with two or more thereof. Since it is possible to supply iodine and lithium ions, lithium iodide is desired.

Lithium ions ionized from lithium salt are used for a charge-discharge reaction in the semiconductor electrode. If the content of the lithium salt in the electrolyte composition is within a range of 0.5 to 5 mol/L, a sufficient effect can be obtained without causing an internal short circuit due to a precipitation of an electrolytic solution between the semiconductor electrode and the opposed electrode. The content of the lithium salt in the electrolyte composition is more preferably from 0.5 to 5 mol/L, particularly preferably from 1 to 3 mol/L.

Desirably, the electrolyte composition further contains an iodide. Examples of the iodide include an iodide of an alkali metal, an iodide of an organic compound, and the molten salt of the iodide. Usable examples of the molten salt of the iodide include iodides of a nitrogen-containing heterocyclic compound such as imidazolium salt, pyridinium salt, quarternary ammonium salt, pyrrolidinium salt, pyrazolidinium salt, isothiazolidinium salt, and isooxazolidinium salt.

Examples of the molten salt of the iodide include 1,1-dimethyl imidazolium iodide, 1-methyl-3-ethyl imidazolium iodide, 1-methyl-3-pentyl imidazolium iodide, 1-methyl-3-isopentyl imidazolium iodide, 1-methyl-3-hexyl imidazolium iodide, 1-methyl-3-isohexyl(branch) imidazolium iodide, 1-methyl-3-ethyl imidazolium iodide, 1,2-dimethyl-3-propyl imidazole iodide, 1-ethyl-3-isopropyl imidazolium iodide, 1-propyl-3-propyl imidazolium iodide, and pyrrolidinium iodide. The molten salt of the iodide may be used alone or in combination with two or more thereof. The content of the molten salt of the iodide in the electrolytic solution is preferably from 0.005 to 7 mol/L. When the content is set within the range, high ion conductivity can be obtained.

An electrolytic solution composition may contain a basic material such as tertiary butyl pyridine (TBP). The basic material is effective in suppressing reverse electron reaction on the tungsten oxide particles.

The electrolyte composition contains iodine preferably in an amount of 0.01 to 5 mol/L. The iodine is mixed with an iodide in the electrolyte composition, and the resultant mixture serves as the reversible redox couple. When the content of iodine is set to 0.01 mol/L or more, an oxidant of the redox couple becomes sufficient and thus charges can be fully transported. When the content of iodine is set to 5 mol/L or less, light can be efficiently provided to the semiconductor layer. The content of iodine is preferably from 0.03 to 1 mol/L.

The electrolyte composition may be in either liquid or gel form, and may contain an organic solvent. When it contains the organic solvent, the viscosity of the electrolyte composition can be further reduced. Thus, the electrolyte composition is easily penetrated into the semiconductor electrode. Usable examples of the organic solvent include cyclic carbonates such as ethylene carbonate (EC), propylene carbonate (PC), and butylene carbonate; linear carbonates such as dimethyl carbonate, methylethyl carbonate, and diethyl carbonate; cyclic esters such as γ-butyl lactone, δ-valerolactone, and δ-caprolactone; acetonitrile, methyl propionate, and ethyl propionate. Further, examples thereof include cyclic ethers such as tetrahydrofuran, and 2-methyltetrahydrofuran; linear ethers such as dimethoxyethane and diethoxy ethane; and nitrile-based solvents such as acetonitrile, propionitrile, glutaronitrile, and methoxy propionitrile. The organic solvents may be used alone or as a mixture of two or more thereof. Among them, cyclic carbonate or cyclic ester is preferred. Cyclic carbonate or cyclic ester is efficient in charge acceptance and delivery, and the effect of reducing the internal resistance is obtained.

The content of the organic solvent is not particularly limited. The content of the organic solvent in the electrolyte composition is preferably 90 wt % or less, more preferably from 50 to 80 wt %.

The size of the gap between the support substrate 13 and the conductive catalyst layer 2 (i.e., a space for injecting the electrolyte composition) is preferably 1.5 to 20 times the thickness of the semiconductor layer. When the size of the gap between the support substrate 13 and the conductive catalyst layer 2 is less than 1.5 times the thickness of the semiconductor layer, namely, the opposed electrode is too close to the semiconductor layer, the electricity stored in the semiconductor layer may be transmitted to the opposed electrode. On the other hand, if the size exceeds 20 times, the electrolyte composition layer becomes too thick and the internal resistance is increased. Thus, the electricity stored in the semiconductor layer may hardly reach the opposed electrode. Therefore, the size of the gap between the support substrate 13 and the conductive catalyst layer 2 (i.e., a space for injecting the electrolyte composition) is preferably 1.5 to 20 times, more preferably 2 to 10 times the thickness of the semiconductor layer.

The Raman spectroscopic analysis of the tungsten oxide particles contained in the secondary battery of the second embodiment is performed as follows. First, the sealed portion on the side surface of the secondary battery is destroyed to remove the electrolyte composition (e.g., an electrolytic solution). Then, the glass substrate at the side of the opposed electrode is removed to expose the semiconductor layer. The layer of tungsten oxide particles is cut out from the semiconductor layer, followed by washing with pure water, an alcohol or an organic solvent to remove the remaining electrolytic solution. The tungsten oxide particles after washing are subjected to Raman spectroscopic analysis. A measurement method for Raman spectroscopic analysis is as described in the first embodiment.

According to the secondary battery of the second embodiment described above, since the semiconductor electrode which includes the substrate for secondary battery according to the first embodiment is used, the electrical storage performance can be improved, for example, an electrical storage function of 100 C/m$^2$ or more can be realized.

EXAMPLES

Hereinafter, examples will be described with reference to the drawings.

Examples 1 to 15 and Comparative examples 1 to 3

First, tungsten oxide (WO$_3$) particles 1 to 3 were synthesized in the following manner.
(Synthesis of Tungsten Oxide (WO$_3$) Particles 1)

A coarse particles of tungsten oxide having an average particle diameter of 3 μm was subjected to a plasma treatment by introducing the particles into the plasma flame (central temperature: 10000° C.) Subsequently, the tungsten oxide scattered from the plasma flame was subjected to a quenching process at a rate of 1000° C./s at a distance of 1 m or more to prepare a tungsten oxide (WO$_3$) particles 1 (sample 1) having an average particle diameter of 10 nm, calculated based on the BET surface area (average: 100 m$^2$/g).
(Synthesis of Tungsten Oxide (WO$_3$) Particles 2)

After the plasma treatment under the same condition as that of the WO$_3$ particles 1, the tungsten oxide was heat-treated at 450° C. for 50 hours to prepare a tungsten oxide (WO$_3$) particles 2 (sample 2) having an average particle diameter of 15 nm, calculated based on the BET surface area (average: 56 m$^2$/g).
(Synthesis of Tungsten Oxide (WO$_3$) Particles 3)

After the plasma treatment under the same condition as that of the WO$_3$ particles 1, the tungsten oxide was heat-treated at 600° C. for 1 hour to prepare a tungsten oxide (WO$_3$) particles 3 (sample 3) having an average particle diameter of 20 nm, calculated based on the BET surface area (average: 42 m$^2$/g).

The obtained samples 1 to 3 were subjected to Raman spectroscopic analysis under the conditions described in the first embodiment. The obtained chart is shown in FIG. 2. In the chart of FIG. 2, a horizontal axis represents a Raman shift (cm$^{-1}$), and a vertical axis represents an intensity (CPS). As is clear from FIG. 2, the sample 1 had a first peak at 269 cm$^{-1}$, a second peak at 695 cm$^{-1}$, and a third peak at 801 cm$^{-1}$. The sample 2 had a first peak at 272 cm$^{-1}$, a second peak at 712 cm$^{-1}$, and a third peak at 805 cm$^{-1}$. The sample 3 had a first peak at 273 cm$^{-1}$, a second peak at 717 cm$^{-1}$, and a third peak at 807 cm$^{-1}$. Therefore, the tungsten oxide (WO$_3$) particles 1 to 3 had a first peak in a range of 268 to 274 cm$^{-1}$, a second peak in a range of 630 to 720 cm$^{-1}$, and a third peak in a range of 800 to 810 cm$^{-1}$.

Subsequently, as shown in Table 1, the WO$_3$ particles 1 to 3 alone, the WO$_3$ particles 1 to 3 coated with Y$_2$O$_3$ or CeO$_2$, the WO$_3$ particles 1 to 3 mixed with each second particles (MgO, Y$_2$O$_3$, C), and a TiO$_2$ particles were prepared as particles forming the semiconductor layer (hereinafter referred to as semiconductor particles). The additive amount of the second particles and the additive amount (mass %) when the total amount of the WO$_3$ particles and the second particles was 100 mass % were also written in Table 1.

TABLE 1

| | Semiconductor particles |
|---|---|
| Example 1 | WO$_3$ powder 1 |
| Example 2 | WO$_3$ powder 1 |
| Example 3 | WO$_3$ powder 1 |
| Example 4 | WO$_3$ powder 1 + MgO powder (average particle diameter: 20 nm, additive amount: 5 parts by mass (5 mass %)) |
| Example 5 | WO$_3$ powder 1 + Y$_2$O$_3$ powder (average particle diameter: 40 nm, additive amount: 3 parts by mass (3 mass %)) |
| Example 6 | WO$_3$ powder 2 |
| Example 7 | WO$_3$ powder 2 |
| Example 8 | WO$_3$ powder 2 coated with Y$_2$O$_3$ |
| Example 9 | WO$_3$ powder 2 coated with CeO$_2$ |
| Example 10 | WO$_3$ powder 2 + MgO powder (average particle diameter: 20 nm, additive amount: 5 parts by mass (5 mass %)) |
| Example 11 | WO$_3$ powder 3 |
| Example 12 | WO$_3$ powder 3 |
| Example 13 | WO$_3$ powder 3 coated with Y$_2$O$_3$ + graphite powder (average particle diameter: 10 nm, additive amount: 6 parts by mass (6 mass %)) |
| Example 14 | WO$_3$ powder 3 coated with Y$_2$O$_3$ |
| Example 15 | WO$_3$ powder 3 coated with CeO$_2$ |
| Comparative Example 1 | TiO$_2$ powder (average particle diameter: 13 nm) |
| Comparative Example 2 | WO$_3$ powder 1 |
| Comparative Example 3 | WO$_3$ powder 1 |

(Production of Substrate for Secondary Battery)

A glass substrate having a thickness of 1.1 mm and a surface resistance of 5Ω/□ was used, and one side of the glass substrate was coated with a transparent conductive film (ITO).

3.6 g of the semiconductor particles of Examples 1 to 15 and Comparative example 1 were mixed with 6.4 g of the binder (EC-100FTP, manufactured by Nisshin Kasei Co., LTD.) to prepare an electrode material paste for batteries. 9 g of the semiconductor particles of Comparative example 2 were mixed with 1 g of the binder to prepare a paste. 1 g of the semiconductor particles of Comparative example 3 were mixed with 9 g of the binder to prepare a paste. Each of the pastes was printed on each of the transparent conductive films by screen printing, followed by sintering at 400 to 480° C. for 30 to 60 minutes. As a result, semiconductor layers having the film thicknesses, porosities, and average pore sizes shown in Table 2 were formed. Then, the substrates for secondary battery of Examples 1 to 15 and comparative examples 1 to 3 were obtained. The film thicknesses, porosities, and average pore sizes of the semiconductor layers were measured by the method described in the first embodiment.

TABLE 2

| | Semiconductor layer | | |
|---|---|---|---|
| | Film thickness (μm) | Porosity (vol %) | Average pore size (nm) |
| Example 1 | 15 | 65 | 15 |
| Example 2 | 15 | 50 | 12 |
| Example 3 | 15 | 35 | 10 |
| Example 4 | 15 | 40 | 12 |
| Example 5 | 15 | 50 | 12 |

TABLE 2-continued

| | Semiconductor layer | | |
|---|---|---|---|
| | Film thickness (μm) | Porosity (vol %) | Average pore size (nm) |
| Example 6 | 15 | 65 | 18 |
| Example 7 | 15 | 35 | 12 |
| Example 8 | 15 | 65 | 18 |
| Example 9 | 15 | 65 | 18 |
| Example 10 | 15 | 50 | 12 |
| Example 11 | 10 | 65 | 20 |
| Example 12 | 10 | 35 | 18 |
| Example 13 | 20 | 65 | 15 |
| Example 14 | 20 | 65 | 20 |
| Example 15 | 20 | 65 | 20 |
| Comparative Example 1 | 15 | 50 | 12 |
| Comparative Example 2 | 15 | 10 | 6 |
| Comparative Example 3 | 0.5 | 95 | 25 |

The secondary batteries were obtained in the following manner using the obtained substrates for secondary battery of the examples and comparative examples.

The opposed electrode was formed by spattering platinum on a glass substrate with a transparent conductive film so as to have a thickness of 80 nm.

A 60-μm-thick spacer resin was arranged so as to open two inlets for the introduction of the electrolyte composition and surround a photoelectrode. The opposed electrode heated at 110° C. was stacked thereon. The electrolyte composition (electrolytic solution) was injected with a syringe from the inlets for the introduction of the electrolyte composition and the inlets were sealed with a two-part curing resin. The used electrolytic solution composition was prepared by dissolving 0.5 M (mole) of lithium iodide, 0.05 M of iodine, 0.58 M of t-butyl pyridine, and 0.6 M of EtMeIm(CN)$_2$ (1-ethyl-3-methylimidazolium dicyanamide) in an acetonitrile solvent. Secondary batteries were produced according to the process.

The electrical storage performance of the obtained secondary batteries was measured. In the measurement method, the secondary batteries of the examples and the comparative examples were charged at 0.74 V for 640 seconds using an external power source, and then the electrical storage capacities were calculated from the values of the current flowing to an external resistance of 510Ω. The obtained electrical storage capacities (C/m$^2$) as the electrical storage functions are shown in Table 3.

TABLE 3

| | Secondary battery Electrical storage function (C/m$^2$) |
|---|---|
| Example 1 | 1000 |
| Example 2 | 1200 |
| Example 3 | 1400 |
| Example 4 | 800 |
| Example 5 | 900 |
| Example 6 | 1200 |
| Example 7 | 1400 |
| Example 8 | 1200 |
| Example 9 | 1100 |
| Example 10 | 800 |
| Example 11 | 1300 |
| Example 12 | 1400 |
| Example 13 | 1100 |
| Example 14 | 1400 |
| Example 15 | 1200 |

TABLE 3-continued

| | Secondary battery Electrical storage function (C/m$^2$) |
|---|---|
| Comparative Example 1 | 0 |
| Comparative Example 2 | 80 |
| Comparative Example 3 | 70 |

As is clear from Table 3, the electrical storage functions of the secondary batteries according to the examples are 100 C/m$^2$ or more. Compared to this, the electrical storage functions of the secondary batteries of Comparative examples 1 to 3 were lower than 100 C/m$^2$.

According to the substrate for secondary battery of at least one of the embodiments and the examples, since the substrate includes a semiconductor layer which includes tungsten oxide particles having a first peak in a range of 268 to 274 cm$^{-1}$, a second peak in a range of 630 to 720 cm$^{-1}$, and a third peak in a range of 800 to 810 cm$^{-1}$ in the Raman spectroscopic analysis and has a thickness of 1 μm or more and a porosity of 20 to 80 vol %, it is possible to realize a secondary battery excellent in electrical storage performance.

Examples 16 to 20

A coarse particles of tungsten oxide having an average particle diameter of 1 μm was subjected to a plasma treatment by introducing the particles into the plasma flame (central temperature: 11000° C.). Then, the particles of tungsten oxide scattered from the plasma flame was subjected to a quenching process at a rate of 1200° C./s or more and at a distance of 1 m or more to prepare a tungsten oxide (WO$_3$) particles.

Subsequently, the obtained tungsten oxide particles was heat-treated at 800° C. for 1 hour to prepare a tungsten oxide (WO$_3$) particles (sample 4) having an average particle diameter of 230 nm, calculated based on the BET surface area (average: 3.6 m$^2$/g).

The obtained sample 4 was subjected to Raman spectroscopic analysis under the conditions described in the first embodiment. The sample 4 had a first peak at 273.6 cm$^{-1}$, a second peak at 717.2 cm$^{-1}$, and a third peak at 807.3 cm$^{-1}$. Therefore, the sample 4 satisfied the following conditions: a first peak in a range of 268 to 274 cm$^{-1}$, a second peak in a range of 630 to 720 cm$^{-1}$, and a third peak in a range of 800 to 810 cm$^{-1}$.

Subsequently, the sample 4 was subjected to a coating treatment with a metal oxide. Y$_2$O$_3$ was used as the metal oxide. MgO particles were prepared as the second particles. The samples 2, 3, and 4, and the second particles were mixed under the conditions of Table 4 and the resultant particles were used as the semiconductor particles in Example 20. The sample 3 was used for the semiconductor particles of Examples 16 to 19. The additive amount (mass) of the second particles when the total amount of the WO$_3$ particles and the second particles was 100 mass % were also written in Table 4.

TABLE 4

| | Semiconductor particles (100 parts by mass) |
|---|---|
| Example 16 | WO$_3$ powder coated with metal oxide (sample 3) |
| Example 17 | WO$_3$ powder coated with metal oxide (sample 3) |
| Example 18 | WO$_3$ powder coated with metal oxide (sample 3) |
| Example 19 | WO$_3$ powder coated with metal oxide (sample 3) |

TABLE 4-continued

| | Semiconductor particles (100 parts by mass) |
|---|---|
| Example 20 | 80 parts by mass of $WO_3$ powder coated with metal oxide (sample 3) + 10 parts by mass of $WO_3$ powder coated with metal oxide (sample 4) + 5 parts by mass of $WO_3$ powder coated with metal oxide (sample 2) + MgO powder (average particle diameter: 15 nm, additive amount: 5 parts by mass (5 mass %)) |

3.6 g of the semiconductor particles of Examples 16 to 20 were mixed with 6.4 g of the binder (EC-100FTP, manufactured by Nisshin Kasei Co., LTD.) to prepare an electrode material paste for batteries. Each of the pastes was printed on each of the transparent conductive films or each of the metal substrates by screen printing, followed by sintering at 400 to 480° C. for 30 to 60 minutes. As a result, semiconductor layers having the film thicknesses, porosities, and average pore sizes shown in Table 5 were formed. Then, the substrates for secondary battery of Examples 16 to 20 were obtained. The film thicknesses, porosities, and average pore sizes of the semiconductor layers were measured by the method described in the first embodiment. When a Ti plate was used as the support substrate, an insulator was stacked on the back surface of the support substrate.

TABLE 5

| | | Semiconductor layer | | |
|---|---|---|---|---|
| | Support substrate | Film thickness (μm) | Porosity (vol %) | Average pore size (nm) |
| Example 16 | ITO film on a glass substrate | 15 | 65 | 13 |
| Example 17 | Ti plate | 40 | 65 | 13 |
| Example 18 | Ti plate | 50 | 65 | 13 |
| Example 19 | ITO film on a glass substrate | 50 | 65 | 13 |
| Example 20 | ITO film on a glass substrate | 50 | 55 | 5 |

As is clear from Table 5, in Example 20 where the tungsten oxide particles having different particle diameters were combined, the average pore size could be reduced.

Secondary batteries were produced in the following manner using the obtained substrates for secondary battery of the examples. Specifically, the thickness of the spacer resin that corresponds to the size of the gap between the support substrate 13 and the conductive catalyst layer 2 as a space for injecting the electrolytic solution, the composition of the electrolytic solution, and the conductive catalyst layer are shown in Table 6. An opposed electrode having the conductive catalyst layer formed on the same support substrate as that used for the support substrate of the semiconductor layer was used. In Table 6, "TBP" means tertiary butyl pyridine.

TABLE 6

| | Thickness of spacer resin (μm) | Electrolytic solution | | Conductive catalyst layer (thickness: μm) |
|---|---|---|---|---|
| | | Organic solvent | Electrolyte composition | |
| Example 16 | 60 | Propylene carbonate | Lithium iodide (1.5 mol/L) Iodine (0.1 mol/L) TBP (1.0 mol/L) | Pt (80 nm) |
| Example 17 | 100 | Propylene carbonate | Lithium iodide (1.5 mol/L) Iodine (0.05 mol/L) TBP (1.0 mol/L) | Pt (80 nm) |
| Example 18 | 100 | γ-butyrolactone | Lithium iodide (2.0 mol/L) Iodine (0.05 mol/L) TBP (1.0 mol/L) | PEDOT (100 nm) |
| Example 19 | 300 | γ-butyrolactone | Lithium iodide (2.0 mol/L) Iodine (0.05 mol/L) TBP (1.0 mol/L) | Pt (80 nm) |
| Example 20 | 200 | γ-butyrolactone | Lithium iodide (2.0 mol/L) Iodine (0.05 mol/L) TBP (1.0 mol/L) | Pt (80 nm) |

The electrical storage performance of the obtained secondary batteries was measured. In the measurement method, the secondary batteries of Examples 16 to 20 were charged at 0.74 V for 640 seconds using an external power source, and then an external resistance was connected to each of the secondary batteries, and then the electrical storage capacities were calculated from the values of the current flowing to the external resistance of 510Ω. The obtained electrical storage capacities ($C/m^2$) as the electrical storage functions are shown in Table 7.

TABLE 7

| | Secondary battery Electrical storage function ($C/m^2$) |
|---|---|
| Example 16 | 3500 |
| Example 17 | 5430 |
| Example 18 | 8280 |
| Example 19 | 13040 |
| Example 20 | 11590 |

As is clear from Table 7, the electrical storage functions of the secondary batteries according to the examples are 100 $C/m^2$ or more, further 3500 $C/m^2$ or more.

According to the substrate for secondary battery of at least one of the embodiments and the examples, since the substrate includes a semiconductor layer which includes tungsten oxide particles having a first peak in a range of 268 to 274 cm$^{-1}$, a second peak in a range of 630 to 720 cm$^{-1}$, and a third peak in a range of 800 to 810 cm$^{-1}$ in the Raman spectroscopic analysis and has a thickness of 1 μm or more and a porosity of 20 to 80 vol %, it is possible to realize a secondary battery excellent in electrical storage performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A substrate comprising a semiconductor layer comprising tungsten oxide particles having a first peak in a range of 268 to 274 cm$^{-1}$, a second peak in a range of 630 to 720 cm$^{-1}$, and a third peak in a range of 800 to 810 cm$^{-1}$ in Raman spectroscopic analysis, said semiconductor layer having a thickness of ±5 μm to 300 μm, a porosity of 35 to 80 vol %, and an average pore size of 5 nm or more.

2. The substrate according to claim 1, wherein an average BET specific surface area of the tungsten oxide particles is 0.1 m$^2$/g or more.

3. The substrate according to claim 1, wherein a coating is formed on at least a part of surfaces of the tungsten oxide particles.

4. The substrate according to claim 3, wherein the coating comprises at least one kind of compound selected from the group consisting of $Y_2O_3$, $TiO_2$, $ZnO$, $SnO_2$, $ZrO_2$, $MgO$, $Al_2O_3$, $CeO_2$, $Bi_2O_3$, $Mn_3O_4$, $Tm_2O_3$, $Ta_2O_5$, $Nb_2O_5$, $La_2O_3$, and ITO.

5. The substrate according to claim 1, wherein the semiconductor layer includes at least one kind of second particles selected from the group consisting of metal oxide particles, metal boride particles, metal fluoride particles, carbonate particles, carbon particles, metal carbide particles, and metal particles.

6. The substrate according to claim 1, wherein an average pore size of the semiconductor layer is from 7 to 20 nm.

7. The substrate according to claim 1, wherein the porosity of the semiconductor layer is from 40 to 70 vol %.

8. A secondary battery comprising:
the substrate according to claim 1;
an opposed electrode; and
an electrolyte composition which is provided between the semiconductor layer of the substrate and the opposed electrode.

9. The secondary battery according to claim 8, wherein an electrical storage function is 100 C/m$^2$ or more.

10. The secondary battery according to claim 8, wherein the electrolyte composition comprises iodine and an iodide.

11. The secondary battery according to claim 10, wherein a concentration of the iodine in the electrolyte composition is from 0.01 to 5 mol/L and a concentration of the iodide is from 0.5 to 5 mol/L.

12. The secondary battery according to claim 8, wherein the electrolyte composition comprises tertiary butyl pyridine.

* * * * *